Oct. 4, 1966     T. G. BERLINCOURT     3,277,322
METHOD AND APPARATUS FOR MAGNETIC FLUX
ACCUMULATION AND CURRENT GENERATION
Filed April 1, 1963     2 Sheets-Sheet 1

INVENTOR.
TED G. BERLINCOURT

BY

ATTORNEY

Oct. 4, 1966 T. G. BERLINCOURT 3,277,322
METHOD AND APPARATUS FOR MAGNETIC FLUX
ACCUMULATION AND CURRENT GENERATION
Filed April 1, 1963 2 Sheets-Sheet 2

*INVENTOR.*
TED G. BERLINCOURT

BY
*A. Fredrick Hamann*

ATTORNEY

United States Patent Office

3,277,322
Patented Oct. 4, 1966

3,277,322
METHOD AND APPARATUS FOR MAGNETIC FLUX ACCUMULATION AND CURRENT GENERATION
Ted G. Berlincourt, Woodland Hills, Calif., assignor to North American Aviation, Inc.
Filed Apr. 1, 1963, Ser. No. 269,597
18 Claims. (Cl. 310—40)

The present invention is directed to a magnetic flux accumulator and more particularly to an accumulator which will permit excitation of a superconducting element.

Superconducting magnet development has thus far been primarily directed to the application of small cross section conductors because of the electrical current lead-in problem associated with large cross section conductors. The thermal losses and electrical contact problems are formidable for normal metal bus bars conducting $10^4$ amperes from a room temperature current source to a liquid helium temperature magnet wound with 0.25 cm.$^2$ cross section superconducting wire. Methods for circumventing this difficulty are of importance because fine wire supermagnets have limited applicability. In this field, the scale-up problems are severe since it appears that for small cross section wire the larger the magnet the smaller the current-carrying capacity. Several possible explanations have been proposed. One possibility is that the probability of a thermal excursion or a flaw over a region of the order of the wire cross section, e.g., $6 \times 10^{-4}$ cm.$^2$, becomes appreciable when wires several miles in length are utilized. However, this probability of a flaw or thermal excursion of a size sufficient to initiate quenching is reduced by orders of magnitude for windings having large cross-sectional areas, i.e., a cross-sectional area of from 0.1 to 1 cm.$^2$.

While other methods (see Physics Letters, vol. 2, No. 5, pp. 257–259, October 1, 1962) have sought to avoid the electrical current lead-in problem, they have done so only by introducing problems of increased expense, inefficiency, increased heat generation through hysteresis losses, and increased flux leakage.

It is therefore the primary object of the present invention to provide a method and apparatus for generating large currents in a superconducting element without encountering the electrical current lead-in problem usually associated with such large electrical currents.

More specifically, the object of the present invention is to provide a superconducting magnetic flux accumulator or current generator with reduced superconducting material requirements which is less costly to construct and to operate at superconducting temperatures.

A still further object of the present invention is to provide a superconducting magnetic flux accumulator which has substantially reduced hysteresis losses and flux leakage paths and increased efficiency of operation.

A still further object of the present invention is to provide a superconducting magnetic flux accumulator in which large cross section superconducting windings may be utilized, thereby substantially reducing the cost and increasing the ease of construction and length of operating life.

These and other objects of the present invention will be more apparent from the following detailed description and claims, together with the accompanying drawings, made a part hereof, in which FIG. 1 is a partially sectioned perspective view of the preferred embodiment;

Figure 6:
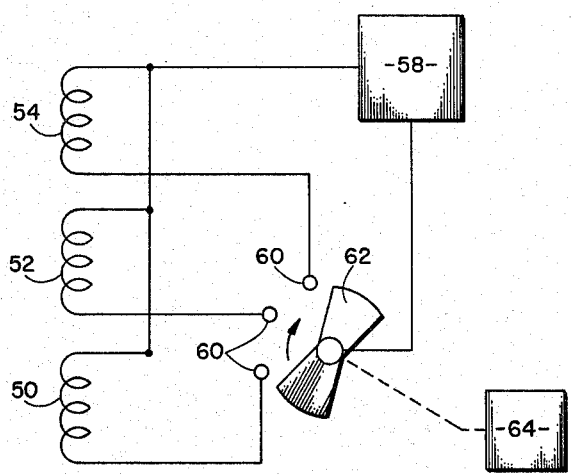
Figure 5:
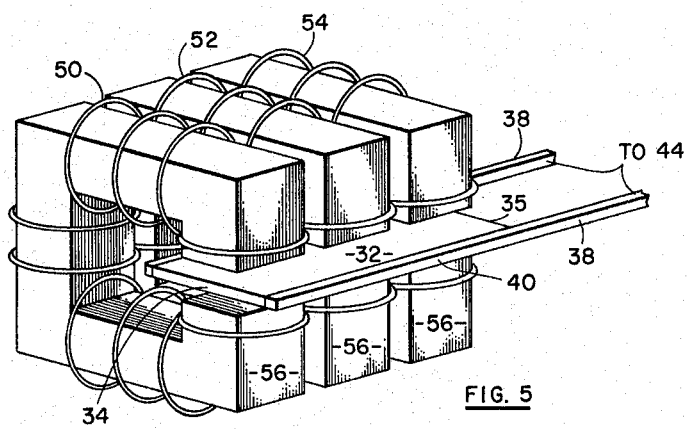
Figure 7:
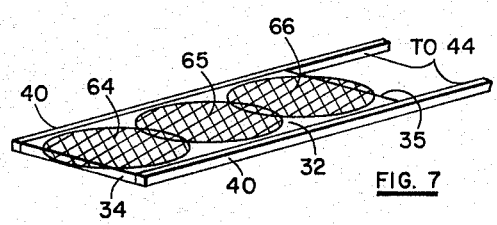

FIGS. 4A, 4B, 4C, and 4D are views of alternative soft superconductor segments;

FIG. 5 is a perspective view of a second embodiment of the present invention;

FIG. 6 is a schematic electrical diagram of the embodiment of FIG. 5;

FIG. 7 is a diagram showing the operation of the embodiment of FIG. 5; and

Figure 8:
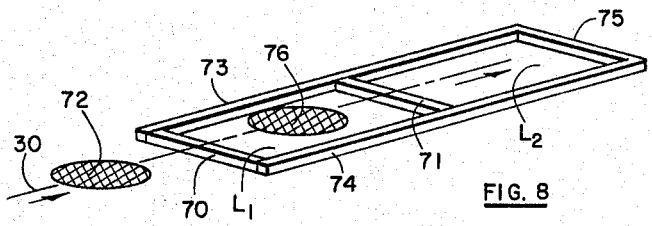

FIG. 8 is a perspective view of another embodiment of the present invention.

Figure 1:
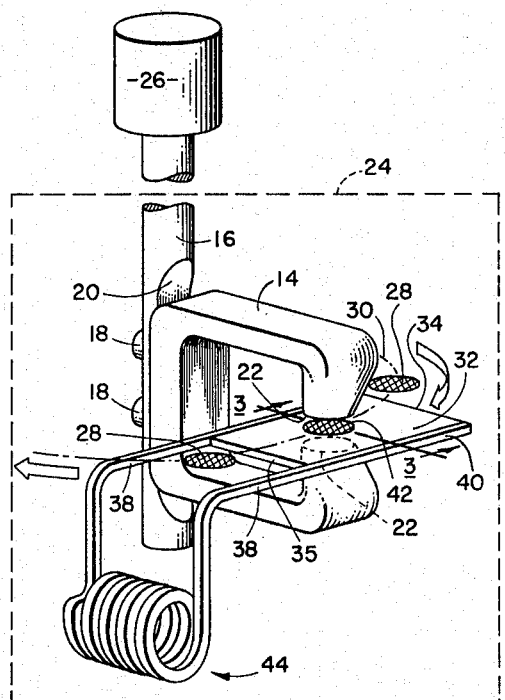

Referring to the drawings in detail, FIG. 1 shows the preferred embodiment of the present invention and comprises a permanent magnet or persistent supermagnet 14 attached to a shaft 16, preferably of insulating material, by bolts 18 or similar means. The shaft 16 may be provided with a flat portion 20 against which the back surface of the magnet 14 is held by bolts 18. The magnet 14 has a general "C" shape with opposed faces 22 spaced apart and preferably parallel to each other and to a plane normal to the axis of rotation of the shaft 16. The shaft 16 extends to a position outside of the cryostat 24 to a motor 26, preferably of a reversible, variable speed type. Upon rotation of the motor 26, shaft 16 and magnet 14, the magnetic flux field is moved along a circular path 30. Along this path is located a segment 32 of a superconducting material having a low critical field which is less than the gap field of the magnet 14, i.e., a material which is superconducting at the predetermined temperature of the cryostat 24 and which preferably exhibits a complete Meissner effect under the influence of a magnetic field of predetermined strength although a material exhibiting an incomplete Meissner effect may also be utilized. Thus, as the magnetic field 28 moves across the segment 32, a magnetic flux threaded area of normal conductivity 42 is produced within the superconducting segment 32. The flux within this normal conductivity region is propagated through the segment 32 into the inside of the superelement circuit. The use of a superconductor exhibiting a complete Meissner effect for the segment 32 assures the delivery of most of the flux entering the segment 32 to the inside of the superelement circuit.

In the preferred embodiment, the segment 32 is a thin sheet of preferably strain-free Pb or Ta which exhibits a complete Meissner effect at 4.2° K., under a flux field of ~550 or ~60 gauss, respectively. Other similar material well known in the art may also be utilized. Such materials are herein referred to as low critical field superconductors, as distinguished from high critical field superconductors which exhibit incomplete Meissner effects at the selected temperature and flux intensity. In the preferred embodiment, the segment 32 is preferably in the form of a rectangle. However, the thin sheet 32 may be in the form of an annular segment having curvilinear edges parallel with the path 28 or it may be of any geometric form. In the preferred embodiment a first boundary 34 is formed between the cryogenic environment within 24 and sheet 32. The segment 32 must have a length along the path 30 which is greater than the length of the effective magnetic field 28, i.e., greater than the length over which the magnetic field induces an area 42 of normal conductivity in the superconducting segment 32. However, the width of the effective field normal to the path 30 is not critical. The requirement as to length of the effective area is met if at any position of the magnetic field on the segment 32 a continuous area or volume of superconductivity in segment 32 separates the normal area 42 from both the first boundary 34 and the second boundary 35.

Two generally opposed limiting boundaries 36 are formed by superconducting leads 38 which have a portion 40 electrically connected along two opposite sides of segment 32. These two limiting boundaries of segment 32 extend in a direction generally parallel to the path 30 of the preferred embodiment. However, there is no requirement relative to operation of the preferred embodiment that the limiting boundaries be parallel, so long as the limiting boundaries are spaced upon opposite sides of the path 30. In the preferred embodiment the limiting boundaries formed by portions 40 of leads 38 are shown as extending along the entire length of the segment 32. This is the preferred arrangement to insure an adequate electrical connection between leads 38 and segment 40. However, point contact may also be utilized and any position for such a point along the opposing limiting boundaries may be selected.

The two limiting boundaries defined by portions 40 of leads 38 of the preferred embodiment may be spaced apart by any selected distance sufficient to assure that the ultimate circuit current does not generate a field at element 32 which is in excess of the critical field of the element 32. However, in order to accumulate as much flux as possible with each pass of the magnetic field the distance between positions 40 as well as the width of the segment 32 is preferably selected so that it is greater than the width of the effective magnetic field 28 along a line normal to the path 30.

The leads 38 are a part of or are connected to a superconducting element in the form of a coil 44 and both leads 38 and coil 44 are fabricated of superconducting material having a high critical field and preferably having large cross-sectional areas.

Figure 3:
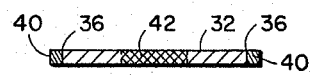
FIG. 3 is a sectional view along line 3—3 of FIG. 1.

The operation of the preferred embodiment is as follows. The magnet 14 is rotated about the axis of shaft 16 by motor 26. As the magnetic field 28 moves along the path 30 and across the first boundary 34, an increasing area of normal conductivity is induced in the segment 32 until the area of normal conductivity 42 is at least bounded by an area of superconductivity adjacent the first boundary 34 and the second boundary 35. The flux lines penetrating the normal area 42 (see FIG. 3 also) induced by the effective magnetic field are trapped, since the surrounding area is superconducting and magnetic flux density less than the critical value does not penetrate a superconducting material. This trapped flux passing through the normal area is moved through the second boundary 35 into the trapping area defined by boundary 35 on one side and the superconducting material of leads 38 and coil 44 on the other side. As the faces 22 of magnet 14 pass along the path 30 and over lead 38 the flux is trapped since the magnetic field between the faces 22 of magnet 14 is too low to drive the high critical field lead 38 into the normal state. This trapped flux is built up in the coil 44 and is increased with every revolution of the magnet in the direction indicated. In this manner, the flux is accumulated in the coil 44 which has a polarity determined by the direction of movement along path 30. It is apparent that if the magnet is rotated in a counter clockwise direction, instead of clockwise as in the preferred embodiment, flux will be continually removed from the coil 44 and a negative field in the coil 44 will be created, i.e., a field which will have a polarity opposite to that accumulated by the clockwise rotation of the magnet faces 22.

The magnet faces 22 are spaced from opposite sides of the segment 32 but are in close proximity to these surfaces so that a maximum of flux lines are present in the normal area induced by the effective field. The generation of a normal area 42 in a superconductor having a low critical field results in the generation of heat and, therefore, the normal area should be generated only during the flux-accumulating period and the effective area should be kept as small as possible while trapping a maximum of the magnetic flux lines of the magnet 14.

Figure 1A:
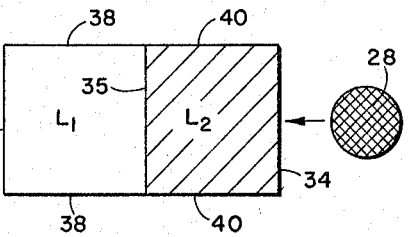

The above described operation may be considered as an electrical circuit shown diagrammatically in FIG. 1A. As the effective flux area 28 moves across boundary 34 into the area of first inductance or low critical field region, indicated as $L_2$, it is trapped by the boundaries 34, 35, and 40. This normal flux threaded area 28 is moved across the second boundary 35 into a second inductance area $L_1$ bounded on three sides by high critical field material 38 and 44. Movement of the pump magnet 14 over any of these three sides leaves them superconducting so the flux remains trapped in $L_1$ even though the pump magnet 14 is removed or de-energized. It can be shown that the flux accumulated is given by $$\phi_1(n) = \phi_G(\mathcal{L} + \mathcal{L}^2 + \mathcal{L}^3 + \cdots \mathcal{L}^n)$$

where $n$ is the number of revolutions, $\phi_G$ is the flux in the air gap of magnet 14, and $$\mathcal{L} = \frac{L_1}{L_1 + L_2}$$

Summing, $$\phi_1(n) = \phi_G \mathcal{L} \left( \frac{\mathcal{L}^n - 1}{\mathcal{L} - 1} \right)$$

For a large number of revolutions, $$\phi_1(\infty) = \phi_G \frac{\mathcal{L}}{1 - \mathcal{L}} = \phi_G \frac{L_1}{L_2}$$

In this manner the flux accumulated $\phi_1$ is proportional to $L_1$ and the flux in the air gap, but is inversely proportional to the inductance $L_2$ in the flux gating means defined by the above described boundaries. It is apparent therefore that by moving an effective field from a remote point representing a noninductive region through the inductance region $L_2$ and then into inductance region $L_1$, from which the flux cannot escape, that flux will be accumulated in region $L_1$.

An example of the approximate characteristics and parameters of one embodiment is shown in Table I.

TABLE I

Permanent magnet:
  Strength _____ 1500 gauss.
  Pole faces _____ Rectangular.
  Area of opposed faces _____ .21 in. (each).
  Spacing between pole faces _ .125 in.
  Radius of path 30 _____ 1.3 in.
Segment 32: _____ Tantalum.
  Form _____ 90° segment of annulus.
  O.D. _____ 1.5 in.
  I.D. _____ .375 in.
  Thickness _____ .03 in.
  Length on mean radius ____ 1.5 in.
  Length of effective magnetic field along mean radius ____ 1.0 in.
Coil 41: _____ Nb–25% Zr.
  O.D. _____ 1.90 in.
  I.D. _____ 0.50 in.
  Length _____ 1.02 in.
  Wire diameter _____ .010 in.
  Number of turns _____ 3,332 (Mylar insulation between layers).
Leads 38 _____ Nb–25% Zr.
Temperature of cryostat _____ 4.2° K.

Figure 2:
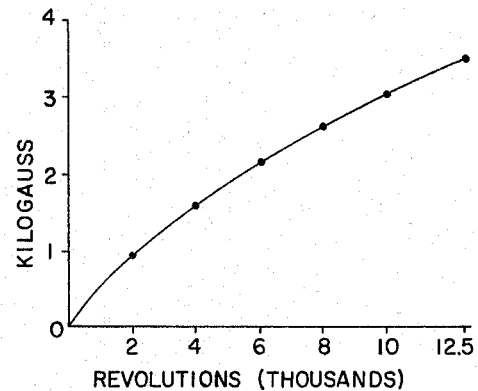
FIG. 2 is a graph of the magnetic field generated in the supermagnet as a function of the number of revolutions of the pump magnet in the embodiment of FIG. 1.

The performance of the embodiment of Table I is shown in FIG. 2 where the magnet was rotated at a speed of 2 r.p.s. for a total of 12,418 turns. The magnet field generated by the accumulated flux in the coil 44 was measured by a standard fluxmeter. FIG. 2 shows that after about 12,500 revolutions of the magnet about a 3.5 kilogauss field had been accumulated in the coil 44. The strength of the permanent magnet 14 was again tested after the accumulation and no detectable change in its strength was measured.

Figure 4C:
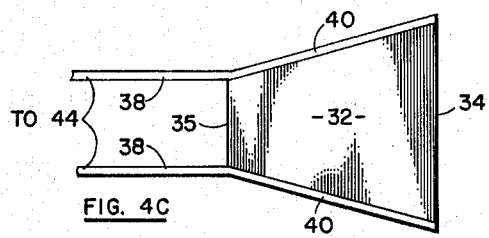
Figure 4A:
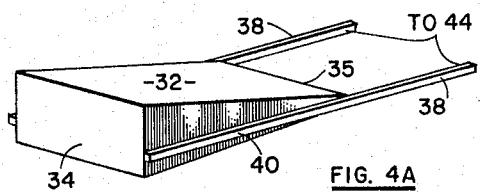
Figure 4D:
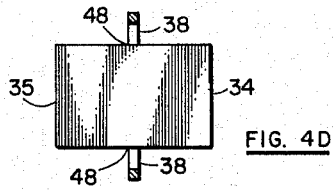
Figure 4B:
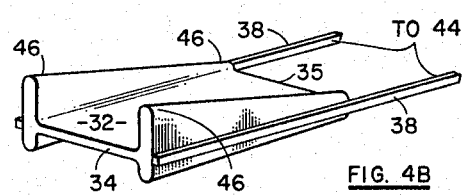

FIGS. 4A through 4D show various shapes and configurations for the segment 32 which may be utilized in the accumulator of the present invention. FIG. 4A shows a wedge-shaped segment 32 in which the thickness at the first boundary 34 is greater than the thickness at the second boundary 35. The decreasing thickness of the low critical field material of which 32 is composed is a path of decreasing reluctance as the effective magnetic field is moved in the preferred direction. FIG. 4B is similar to FIG. 4A except that web portions 46 are included to present a high reluctance path to the flux at the edges of the segment 32. These edges are often exposed to a concentrated magnetic field which may result in creating large areas of normal conductivity and consequent heat generation without a proportional increase in trapped flux. FIG. 4C shows a wedge 32 of constant thickness but with decreasing width. In this manner a larger effective magnetic field area may move across the boundary 34 and, as it moves in the direction of the second boundary 35, it is compressed between high critical field material boundaries 36. Thus, a smaller volume of low critical field superconductor is utilized and less heat is generated by the hysteretic behavior of the low critical field material. FIG. 4D shows a thin sheet 32 similar to the embodiment of FIG. 1 but where the leads 38 have a point contact at 48, the contact point 48 defining the boundary 36. In this manner a more inexpensive electrical connection is utilized.

While the embodiment of FIG. 1 has been described as utilizing one or more permanent magnets, this embodiment may also utilize one or more electromagnets or superconducting magnets which are selectively energized as the shaft 16 carrying them is rotated. A simpler embodiment utilizing electromagnets is shown in FIG. 5. In this embodiment a series of at least three magnetic coils 50, 52, and 54, which may utilize air cores in place of the iron cores 56 shown, are provided with an air gap in which a segment 32, as previously described, is placed. One end of each of the coils 50, 52, and 54 is connected to one side of a source of voltage 58 (see FIG. 6). The other end is connected to switch terminals 60 (see FIG. 6). The other side of the source 58 is connected to a rotating switch 62 which is rotated at a predetermined rate by motor 64. The switch 62 has a contact width which is sufficient so that after coil 50 is energized, coil 52 will be energized before coil 50 is de-energized by the passage of switch 62 from the first terminal 60. In a similar manner coil 54 is energized before coil 52 is de-energized so that a traveling magnetic field is generated. The electromagnets 50, 52, and 54 are positioned along the length of the segment 32 so that each generates an effective field area, 64, 65, and 66 (see FIG. 7) which overlaps the adjacent effective field area and which is of sufficient magnitude to generate a normally conductive effective area. The effective area 64 of the first electromagnet 50 must also overlap the boundary 34 while the last effective area must overlap the boundary 35. In this manner as the electromagnets 50, 52, and 54 are sequentially energized by the circuit of FIG. 6, a first effective area 64 is generated and flux lines pass through the corresponding portion of the segment 32. Prior to the de-energization of magnet 50, electromagnet 52 is energized. Since a normally conductive area in the segment 32 cannot be generated unless the magnetic flux is brought across the boundary 34, the flux lines generated in area 64 spread into the area 65 to generate a normally conducting area before the electromagnet 64 is de-energized. At this time the magnetic field of electromagnet 52 penetrates the normal area 65 and the magnet 64 is de-energized. In this manner the flux is trapped in flux trapping means or low critical field area. When magnet 54 is energized the operation is similar and the flux spreads into the high critical field region, i.e., the area bounded by leads 38, the coil 44, and the boundary 35. When magnet 54 is de-energized the flux lines are trapped in the high critical region and a magnetic field is generated by the current passing in coil 44. This operation may be continuously repeated to generate large magnetic fields in the coil 44.

Another embodiment of the present invention is shown in FIG. 8. In this embodiment, the first and second boundaries are defined by thin wires 70 and 71 made of superconducting material having a low critical field. The wires 70 and 71 are spaced along the path 30 of a moving magnetic field 72 and are generally normal to the magnetic field 72 which may be generated in the manner described above with reference to FIGS. 1 and 5. The side boundaries of the low critical field region or area of the first inductance $L_2$ are formed by wires 73 and 74 of high critical field material which are electrically connected to opposite ends of each of the wires 70 and 71 and have their respective extremities electrically connected to opposite ends of a superconducting element 75. This embodiment which utilizes a wire of high critical field material as element 75 in which a high current may be produced, is particularly useful in measuring the current-carrying capacity of superconducting materials.

In operation, a magnetic field 72 is generated outside of critical field regions $L_1$ or $L_2$ and is moved across the first boundary 70 of the low critical region $L_2$ driving the element 70 normal so that the flux may enter into the region $L_2$ which is a region of cryogenic environment surrounded by superconducting wires 70, 71, 73, and 74. The extent of the field 76 in the region $L_2$ must be less than the distance between 70 and 71 so that the wire 70 will revert to the superconducting state after passage of the flux into $L_2$. As the field 76 is moved across the second boundary of area $L_2$, represented by wire 71, the magnetic flux will distribute itself between the inductances $L_1$ and $L_2$, when a normal area is generated in boundary wire 71. Thus, the normal area in the boundary wire 71 acts as a flux gate in the same manner as 70.

With an initial magnetic flux in the pump magnet gap of $\phi_G$ the movement of this flux through area $L_2$ into $L_1$ results in a magnetic flux distribution as follows:

Area 1

$$\frac{L_1}{L_1+L_2}\phi_G$$

Area 2

$$\frac{L_2}{L_1+L_2}\phi_G$$

When the boundary 70 is changed to a normal state by the next passage of the magnetic field, the flux $$\frac{L_2}{L_1-L_2}\phi_G$$

in area 2 is lost. This redistribution of the flux in areas 1 and 2 continues each time the field $\phi_G$ is moved along the path 30 until the amount of flux lost in the redistribution is equal to $\phi_G$. At this time the flux accumulator or current generator of FIG. 8 is saturated. This saturation occurs regardless of the direction of movement of the flux field along path 30. This embodiment will reach saturation at a much lower accumulated field than will the embodiments of FIGS. 1 and 5 since the flux trapping is not as complete as the case where a solid sheet of low critical field material is utilized in the segment 32, i.e., the effective inductance of the region $L_2$ is greater for this embodiment than for the embodiments of FIGS. 1 and 5. On the other hand, hysteresis losses will be less for this embodiment than for the embodiments of FIGS. 1 and 5. The magnetic flux field may be moved along path 30 of FIG. 8 by any of the means described above with respect to the various embodiments of the invention.

While preferred embodiments have been described in detail, changes and modifications will be apparent to persons skilled in the art. Such modifications, e.g., limiting the cryogenic environment to include only the superconducting material so that the magnetic field source is located outside of that environment, are considered within the purview of the present invention as set forth in the following claims.

What is claimed is:

1. A magnetic flux accumulator comprising flux gating means including at least one element of a first superconducting material having a first critical field, said gating means defining a first area of inductance having a first boundary defined by one edge of said first material and a second boundary defined by another edge of said first material, said boundaries being spaced at a predetermined distance, a second superconducting element of a second superconducting material having a critical field higher than said first material and defining a second area of inductance bounded on one side by one of said boundaries, superconducting means electrically connecting said flux gating means and said second element in a closed electrical circuit, means for moving a magnetic flux along a path in a direction across one of said boundaries through said flux gating means and then across the other of said boundaries, said flux having sufficient strength to change the conducting state of only said first material to a normal state, and means for maintaining said gating means, superconducting means, and said second element at cryogenic temperatures.

2. The magnetic flux accumulator of claim 1 wherein said at least one element includes a sheet of said first material.

3. The magnetic flux accumulator of claim 1 wherein said at least one element includes a pair of spaced elongated elements of said first material, each of said elements defining one of said boundaries.

4. The magnetic flux accumulator of claim 1 wherein means for moving said magnetic field along a path moves said field across said first boundary through said flux gating means and then across said secondary boundary into said second inductance area.

5. A magnetic flux accumulator comprising flux gating means including a first element of a first superconducting material having a first critical field, said first element having a continuous surface defining a first inductance area, said surface having an edge defining a first boundary and a second edge defining a secondary boundary of said inductive area, said boundaries being spaced at a predetermined distance, a second superconducting element of a second superconducting material having a critical field higher than said first material and formed to define a closed inductance area bounded on one side by said second boundary, means electrically connecting said flux gating means and said second element in a closed electrical circuit, means for moving a magnetic flux along a path in a direction across one of said boundaries through said first inductance area and across another of said boundaries, said flux having sufficient strength in an effective area to change the conducting state of only said first material in said effective area to a normal state, said magnetic flux effective area having a length along said direction of magnetic field movement less than said predetermined distance, and means for maintaining said flux gating means and said second element at cryogenic temperatures.

6. The magnetic flux accumulator of claim 5 wherein said first element is wedge-shaped.

7. The magnetic flux accumulator of claim 5 wherein said magnetic field is moved across said first boundary through said first inductance area and at least partially into said closed inductance area.

8. A magnetic flux accumulator comprising flux gating means including a first element of a first superconducting material having a first critical field, said first element being a solid segment having a continuous surface defining a first inductance area, said segment having one edge defining a first boundary and another edge defining a second boundary of said first inductive area, said edges being spaced at a predetermined distance along a predetermined path, a second superconducting element of a second superconducting material having a critical field higher than said first material, a pair of electrical leads of said second material connected to said second element, a portion of said leads electrically connected to opposite sides of said first element, said first portions defining the other boundaries of said first inductance area, said second element and the other portion of said leads defining a second inductance area, means for moving a magnetic flux along said predetermined path so that said magnetic flux passes at least partially across one of said boundaries through said first inductance area and at least partially across the other of said boundaries, said flux having sufficient strength in an effective area to change the conducting state of only said first material in said effective area to a normal state, said effective magnetic flux having a length along said predetermined path less than said predetermined distance, and means for maintaining said flux gating means, said second element, and said leads at a predetermined cryogenic temperature.

9. The magnetic flux accumulator of claim 8 wherein said solid segment has a cross-sectional area decreasing in the direction of magnetic flux movement.

10. The magnetic flux accumulator of claim 8 wherein said means for moving said magnetic flux includes a plurality of electromagnets.

11. The magnetic flux accumulator of claim 8 wherein said means for moving said magnetic flux includes a plurality of stationary electromagnets and means for selectively energizing said magnets.

12. The magnetic flux accumulator of claim 8 wherein said means for moving said magnetic flux includes means for generating a magnetic field and means for rotating said generating means so that said effective magnetic flux area is moved along said predetermined path.

13. The flux accumulator of claim 8 wherein said second superconducting element is a coil.

14. The magnetic flux accumulator of claim 8 wherein said means for moving said magnetic flux includes at least three electromagnets, one of said magnets generating a first effective field in said first inductance area and bisecting one of said boundaries, a second magnet generating a second effective field within said first inductance area and overlapping said first effective field, a third magnet generating a third effective field overlapping said second effective field and bisecting the other of said boundaries, and means for selectively energizing said electromagnets in a predetermined sequence.

15. The magnetic flux accumulator of claim 14 wherein said last-named means includes switch means for sequentially energizing said first, second, and third electromagnets in a manner so that said second electromagnet is energized prior to the de-energization of said first magnet and subsequent to the energization of said third electromagnet.

16. A method of accumulating flux in a superconducting coil comprising the steps of moving a magnetic field from outside a low critical field region into said low critical region, said low critical region trapping a portion of the flux of said field, moving said trapped flux portion through said low critical region into a high critical field region contiguous with said low critical region, said high critical region containing said coil, moving said field to a point remote from said low and high critical region in a manner such that flux is trapped in said high critical field region, and sequentially repeating said steps to accumulate flux in said coil.

17. A method of claim 16 wherein said step of moving a magnetic field includes the steps of sequentially generating a plurality of overlapping magnetic fields.

18. A magnetic flux accumulator comprising a first superconducting means for accumulating a magnetic field, said first superconducting means including a coil and leads connected to said coil, said coil and leads being fabricated of a superconducting material having a large cross-sectional area, flux gating means electrically connected to said first superconducting means, said flux gating means including at least one element of a superconducting material having a critical field lower than the critical field of said first means, means for moving a magnetic flux into and through said flux gating means in a predetermined direction so that a magnetic field is generated in said first means, said at least one element including a pair of spaced wires of said lower critical field material connected across said leads and generally normal to said predetermined direction of magnetic flux movement, said magnetic field having a magnitude sufficient to generate a normally conductive volume in said at least one element but insufficient to change the superconducting state of said first means.

References Cited by the Examiner
UNITED STATES PATENTS

| | | | |
|---|---|---|---|
| 2,983,889 | 5/1961 | Green | 338—32 |
| 3,150,291 | 9/1964 | Laquer | 317—123 |

OTHER REFERENCES

Solid-State Electronics, vol. 1, September 1960, "An approach to the Experimental Study of Persistent-Current Devices," C. R. Vail et al., pp. 279–281.

Journal of Applied Physics, vol. 33, No. 7, July 1962, some experimental consequences of "Flux Conservation Within Multiply-Connected Superconductors," Hildebrandt et al., pp. 2375–2377.

Physics Letters, Oct. 1, 1962, vol. 2, No. 5, pp. 257 to 259, inclusive.

MILTON O. HIRSHFIELD, *Primary Examiner.*

SAMUEL BERNSTEIN, DAVID X. SLINEY,
*Examiners.*

D. YUSKO, *Assistant Examiner.*